(12) United States Patent
Shibatani et al.

(10) Patent No.: US 7,941,051 B2
(45) Date of Patent: May 10, 2011

(54) LASER OPTICAL DEVICE AND CONTROL METHOD OF ACTUATOR

(75) Inventors: Kazuhiro Shibatani, Sakai (JP); Yoshiaki Hata, Ashiya (JP); Shingo Kanezawa, Hachioji (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 812 days.

(21) Appl. No.: 11/827,711

(22) Filed: Jul. 13, 2007

(65) Prior Publication Data

US 2008/0019702 A1    Jan. 24, 2008

(30) Foreign Application Priority Data

Jul. 21, 2006 (JP) ................................. 2006-199202
Aug. 18, 2006 (JP) ................................. 2006-223160

(51) Int. Cl.
*G02B 6/26* (2006.01)
*G02B 7/02* (2006.01)
*H04N 5/225* (2006.01)
*H04B 10/00* (2006.01)

(52) U.S. Cl. .......... 398/135; 398/131; 398/129; 700/66; 385/129

(58) Field of Classification Search .................. 398/135, 398/131; 385/129, 52
See application file for complete search history.

(56) References Cited

U.S. PATENT DOCUMENTS

| | | | | |
|---|---|---|---|---|
| 4,744,761 A * | 5/1988 | Doerfel et al. | ................... | 434/13 |
| 5,444,561 A * | 8/1995 | Kaminishi | ..................... | 398/155 |
| 5,490,015 A * | 2/1996 | Umeyama et al. | ............. | 359/824 |
| 6,157,025 A * | 12/2000 | Katagiri et al. | ................ | 250/226 |
| 6,188,161 B1 * | 2/2001 | Yoshida et al. | ................ | 310/328 |
| 6,512,321 B2 * | 1/2003 | Yoshida et al. | ........... | 310/316.01 |
| 7,076,171 B2 * | 7/2006 | Ohtsubo | ........................ | 398/129 |
| 7,155,129 B2 * | 12/2006 | Bringans et al. | .............. | 398/131 |
| 7,190,905 B2 * | 3/2007 | Sakanaka | ....................... | 398/129 |
| 7,289,736 B1 * | 10/2007 | Graves | .......................... | 398/119 |
| 7,547,867 B2 * | 6/2009 | Shibatani | .................... | 250/201.2 |
| 7,646,986 B2 * | 1/2010 | Yasumoto et al. | ............. | 398/156 |
| 2002/0054409 A1 * | 5/2002 | Bartur et al. | .................. | 359/152 |
| 2003/0142915 A1 * | 7/2003 | Lefebvre | ......................... | 385/52 |
| 2003/0219201 A1 * | 11/2003 | Arimoto et al. | .................. | 385/31 |
| 2005/0025492 A1 * | 2/2005 | Marazzi et al. | ................ | 398/131 |
| 2005/0090912 A1 * | 4/2005 | Ichikawa et al. | ................ | 700/66 |
| 2005/0107909 A1 * | 5/2005 | Wynblatt et al. | .............. | 700/213 |

(Continued)

FOREIGN PATENT DOCUMENTS

JP    2003-338795 A    11/2003

*Primary Examiner* — Ken N Vanderpuye
*Assistant Examiner* — Oommen Jacob
(74) *Attorney, Agent, or Firm* — Sidley Austin LLP

(57) ABSTRACT

A laser optical device, having: a laser light emitting section to emit laser signal light modulated by information; a laser light receiving section to receive the laser signal light emitted from the laser light emitting section; a light condensing optical unit to conduct the laser signal light emitted from the laser light emitting section to the laser light receiving section; an actuator to move the light condensing optical unit; a light intensity detecting section to detect an intensity of the laser signal light conducted to the laser light receiving section; and a control section to control drive of the actuator so as to align the laser signal light conducted by the light condensing optical unit to the laser light receiving section; wherein the control section drives the actuator in a predetermined period which synchronizes with a predetermined signal included in the laser signal light.

14 Claims, 11 Drawing Sheets

U.S. PATENT DOCUMENTS

| | | | |
|---|---|---|---|
| 2005/0111794 A1* | 5/2005 | Wang et al. ................... 385/52 |
| 2005/0212384 A1* | 9/2005 | Okamoto ................ 310/323.01 |
| 2005/0259155 A1* | 11/2005 | Okada ..................... 348/207.99 |
| 2005/0265137 A1* | 12/2005 | Hezemans ................ 369/44.14 |
| 2006/0238904 A1* | 10/2006 | Nakashima et al. .......... 359/824 |
| 2006/0276912 A1* | 12/2006 | Pearce et al. ................... 700/20 |
| 2007/0139487 A1* | 6/2007 | Sekiguchi ....................... 347/70 |
| 2008/0019702 A1* | 1/2008 | Shibatani et al. ............. 398/182 |
| 2008/0212108 A1* | 9/2008 | Shibatani ...................... 356/614 |
| 2008/0240181 A1* | 10/2008 | Shibatani ................ 372/29.014 |
| 2008/0243272 A1* | 10/2008 | Shibatani ........................ 700/59 |
| 2010/0166028 A1* | 7/2010 | Shibatani et al. ............... 372/14 |

* cited by examiner

FIG. 3 (a)
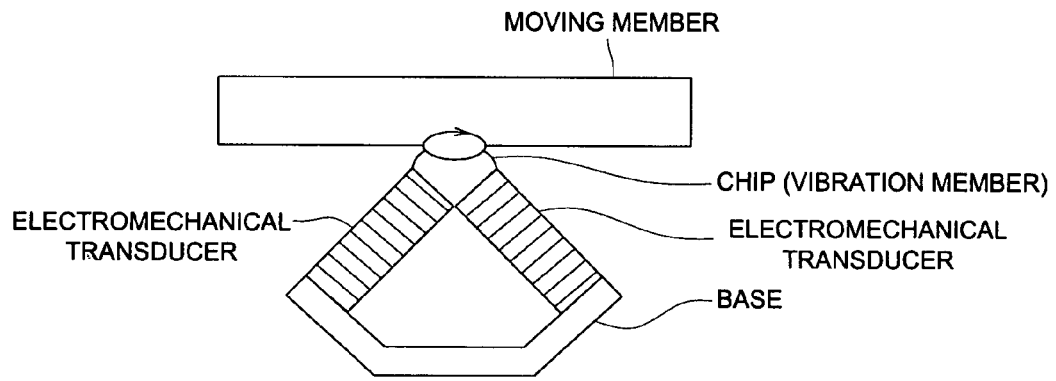
FIG. 3 (b)
FIG. 3 (c)
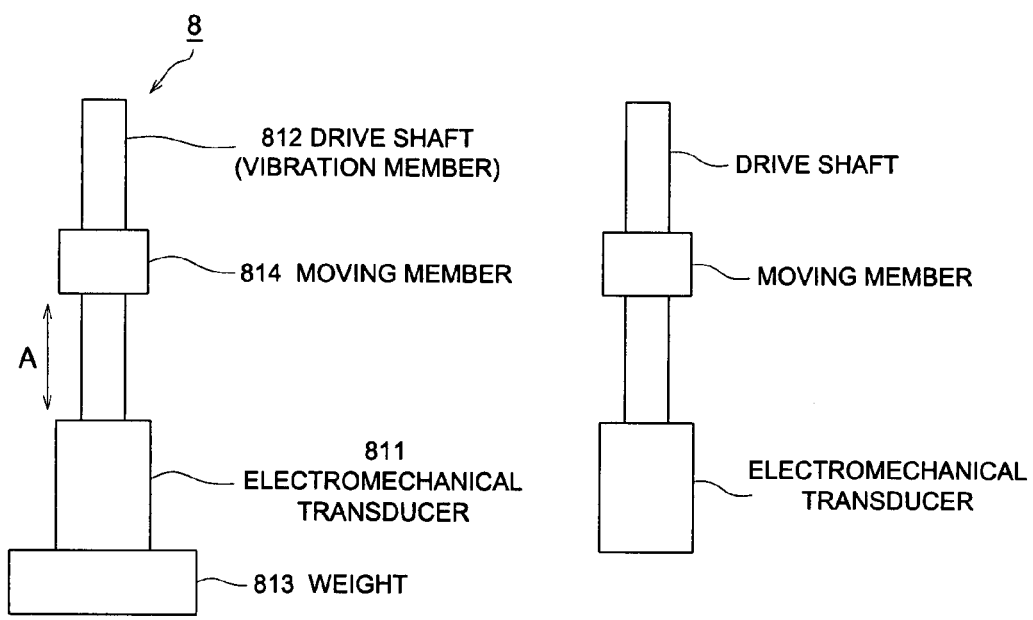

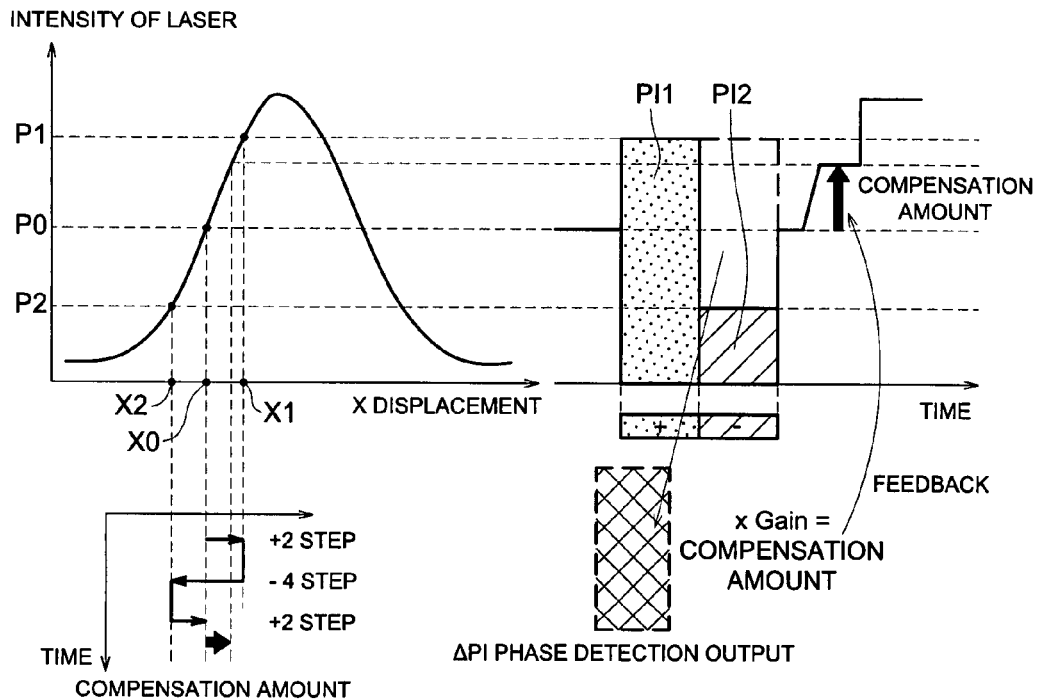
FIG. 7 (a)    FIG. 7 (b)
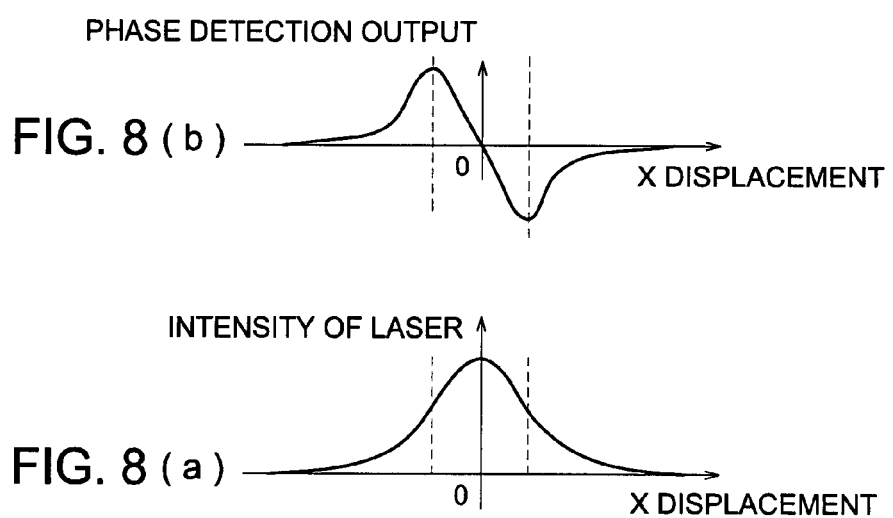
FIG. 8 (b)
FIG. 8 (a)

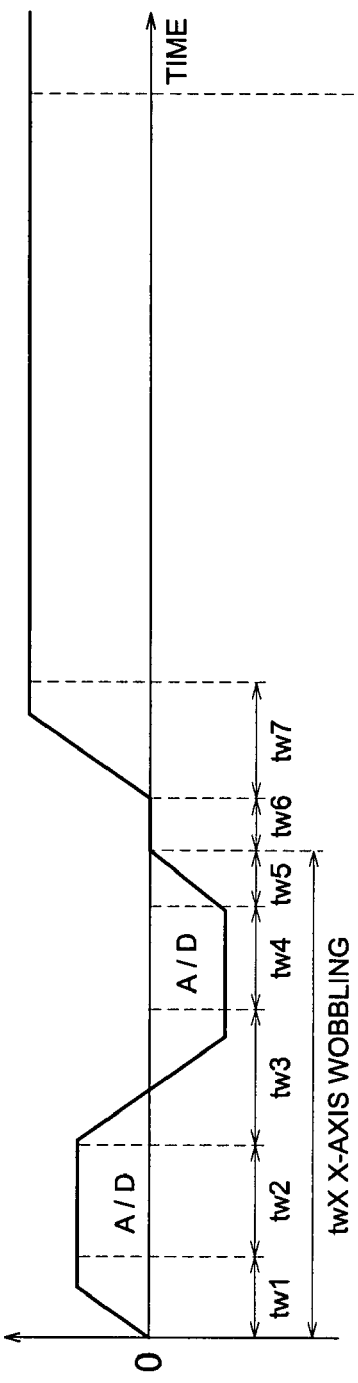
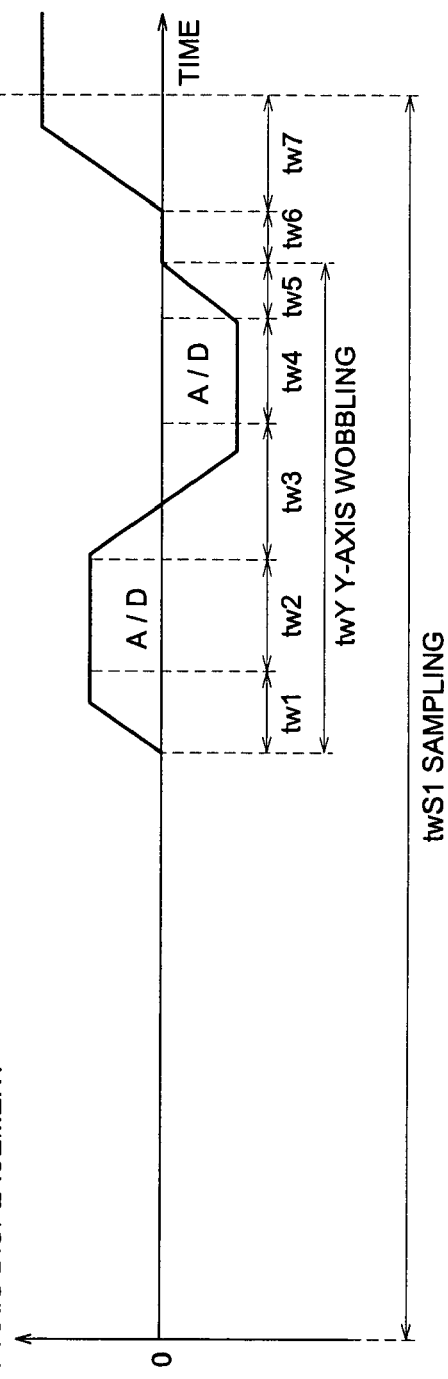
FIG. 10 (a) X-AXIS DISPLACEMENT
FIG. 10 (b) Y-AXIS DISPLACEMENT

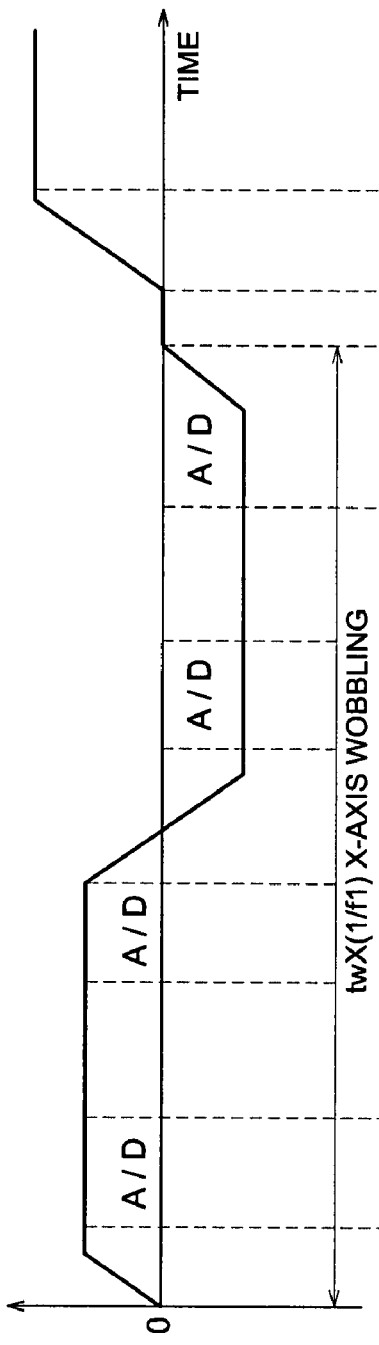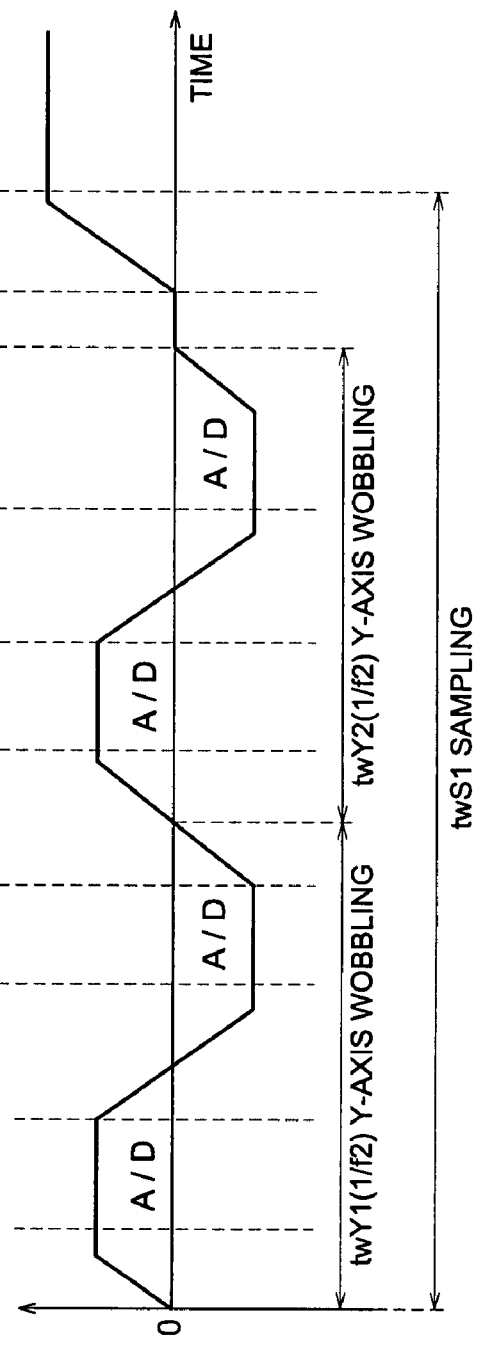
FIG. 11 (a) X-AXIS DISPLACEMENT
FIG. 11 (b) Y-AXIS DISPLACEMENT

LASER OPTICAL DEVICE AND CONTROL METHOD OF ACTUATOR

This application is based on Japanese Patent Applications No. 2006-199202 filed on Jul. 21, 2006, and No. 2006-223160 filed on Aug. 18, 2006 in Japanese Patent Office, the entire content of which is hereby incorporated by references.

BACKGROUND OF THE INVENTION

The present invention relates to a laser optical device to align a laser beam to an incident surface of an optical fiber and an operating method of an actuator.

The laser optical device is to emit light by a semiconductor laser element (hereinafter called LD), propagates a laser signal light modulated by information to an optical fiber or propagates a laser signal light emitted from a optical fiber to the other optical fiber and is configured with optical parts such as LD, a condenser lens to condense the laser signal light form LD or the optical fiber and the optical fiber.

In such laser optical device, LD and the condenser lens have to be aligned with high accuracy in respect to the optical fiber having a core diameter of some μm, thus generally these optical parts are firmly fixed by welding or by an adhesive.

However, even if the laser optical device is configured by adhesive so that the relative position of the parts is accurately aligned and firmly fixed is such way, the following problems remain. First, in case the laser optical device is manufactured in the above way, the quality of the product can be checked only after adhesion and drying. Also, it is considered that achieving of a high yield rate in manufacturing of such laser optical device is relatively difficult. Second, in case the performance is deteriorated with time, correction is impossible. Third, the fixed position is changed with variation in temperature. In case a laser light source is located particularly near the optical parts, an effect caused by heat generated by the laser light source is large.

Therefore, various structures of the laser optical devices to maintain high performance without being affected by environmental variation including a change of mechanical conditions such as a vibration, a change of ambience temperature and a deterioration with time have been desired and studied.

For example, there is known a technology of optical communication device (Patent Document 1) which controls to direct laser signal light to a core center, having a condenser lens to condense a laser signal light from laser light source towards an optical fiber, an actuator to move the condenser lens, a light detecting device to detect an intensity of the laser signal light conducted in the optical fiber, a polarization device to polarize the laser signal light, and a control device to control the polarization device by negative feedback with an output of the light detecting device, wherein the control device detects a change of the intensity of the laser signal light through the light detecting device while the light polarization device causes wobbling to the laser signal light in a predetermined amplitude and frequency in X-direction or Y-direction, and captures a deviation of the laser signal light from a core center of an incident surface of the optical fiber based on the detection result.

[Patent Document 1] Unexamined Japanese Patent Application Publication No. 2003-338795

Meanwhile, in order to control the laser light so as to be directed to a center of the incident surface of the optical fiber, an actuator having a micron order resolution capable of high accuracy positioning control is required. Also, the laser signal light modulated by information such as communication data and image data is required to propagate the information accurately without being affected by change of the intensity of the laser signal light caused by wobbling.

However, the optical communication device disclosed in Patent Document 1 does not have suggestion to cope with accurate propagation of the information without being affected by the change of the intensity, considering the change of the intensity of the laser signal light caused by wobbling. The optical communication device disclosed in the Patent Document 1 does not have such actuator as above having high resolution capable of highly accurate positioning control and it is thought that sub-micron order positioning controls is difficult to be implemented. Also, the condenser lens is moved through the actuator driven by a sine wave signal, and the change of the intensity of the laser light is detected while the condenser lens is moving, namely during wobbling. Therefore, a S/N rate is deteriorated and detection of change of the intensity of the laser light is difficult.

SUMMARY OF THE INVENTION

The invention has been achieved in view of the above problems, and an object of the present invention is to provide a laser optical device capable of accurate propagation of information and maintaining high performance, in the laser optical device to position the laser signal light condensed and modulated by the information to the incident surface of the optical fiber.

The above object is achieved by the following.

(1) A laser optical device, having: a laser light emitting section to emit laser signal light modulated by information; a laser light receiving section to receive the laser signal light emitted from the laser light emitting section; a light condensing optical unit to conduct the laser signal light emitted from the laser light emitting section to the laser light receiving section; an actuator to move the light condensing optical unit; a light intensity detecting section to detect an intensity of the laser signal light conducted to the laser light receiving section; and a control section to control drive of the actuator so as to align the laser signal light conducted by the light condensing optical unit to the laser light receiving section; wherein the actuator has an electromechanical transducer and a vibration member to generate wobbling by excitation of the electromechanical transducer, in contact with the light condensing unit so that a friction force acts on the light condensing optical unit directly or indirectly.

(2) A laser optical device, having: a laser light emitting section to emit laser signal light modulated by information; a laser light receiving section to receive the laser signal light emitted from the laser light emitting section; a light condensing optical unit to conduct the laser signal light emitted from the laser light emitting section to the laser light receiving section; an actuator to move the light condensing optical unit; a light intensity detecting section to detect an intensity of the laser signal light conduced to the laser light receiving section; and a control section to control drive of the actuator so as to align the laser signal light conduced by the light condensing optical unit to the laser light receiving section; wherein the control section drives the actuator in a predetermined period which is synchronized with a predetermined signal included in the laser signal light.

(3) A control method of an actuator to control operation of the actuator wherein a light condensing unit to conduct laser optical section is moved by the actuator so that laser light emitted from a laser emitting section is directed to a center of an incident surface of a laser light receiving section by moving, and wherein the actuator generates a minute vibration by excitation of an electromechanical transducer, and has an electromechanical transducer and a vibration member in contact with the light condensing unit so that a friction force acts on the light condensing optical unit directly or indirectly, comprising: detecting intensity of the laser light led into the laser light receiving section while drive of the actuator is being ceased; first wobbling to move the light condensing unit in a first moving direction with a predetermined frequency in a cycle based on the intensity of the laser light detected in the detection step; and second wobbling to move the light condensing unit in a second moving direction perpendicular to the first moving direction with a predetermined frequency in a cycle; wherein the first wobbling and second wobbling are implemented alternatively.

BRIEF DESCRIPTION OF THE DRAWINGS

FIG. 3 is a configuration diagram of an actuator of a laser optical device related to the present invention.

FIG. 7 is a frame format showing wobbling operation of a laser optical device related to the present invention.

FIG. 8 is a frame format showing a relationship between a laser profile and a phase detection output in a laser optical device related to the present invention.

FIG. 10 is a time chart of wobbling operation of an example of a laser optical device related to the present invention.

FIG. 11 is a time chart of wobbling operation of the other example of a laser optical device related to the present invention.

DETAILED DESCRIPTION OF THE PREFERRED EMBODIMENT

The following describes embodiments of the laser optical device related to the present invention with reference to drawings. The present invention is described with reference to the embodiments shown by drawings without the present invention being restricted thereto.

Embodiment 1

Figure 1:
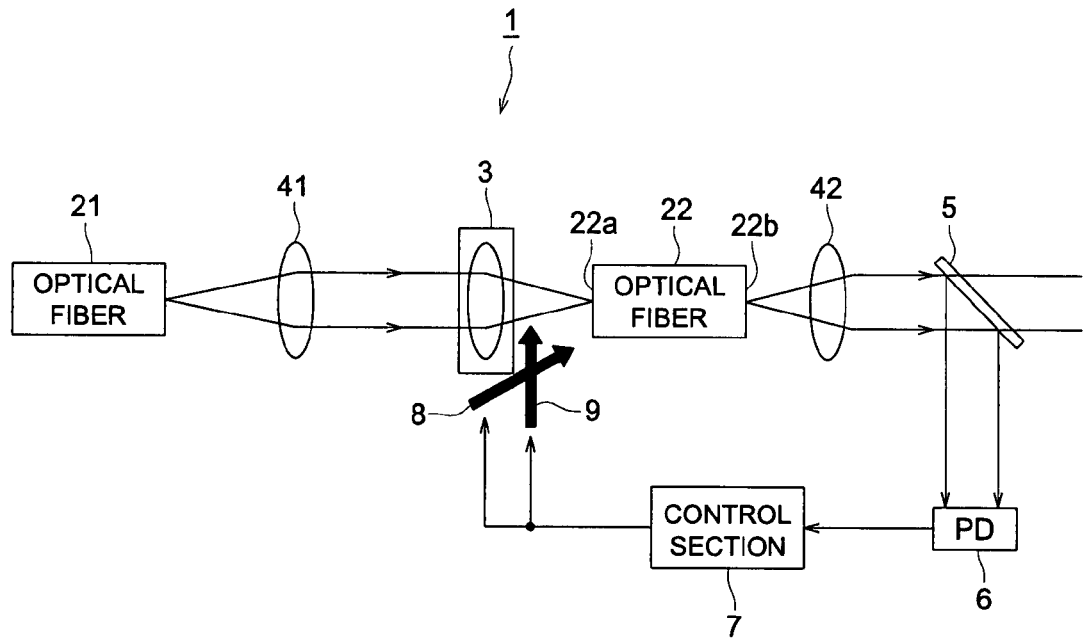
FIG. 1 is an entire configuration diagram of a laser optical device related to the present invention.

First, a structure of a laser optical device is described with reference to FIG. 1. FIG. 1 is a view showing an outline of an entire structure of laser optical device 1.

As FIG. 1 shows, laser optical device 1 has optical fibers 21 and 22, light condensing optical unit 3, collimater lenses 41 and 42, half mirror 5, photo diode 6, control section 7, and actuators 8 and 9.

Optical fibers 21 and 22, light condensing optical unit 3, collimater lenses 41 and 42 are disposed in a common optical axis and laser light emitted from optical fiber 21 is condensed towards incident surface 22a of optical fiber 22 through light condensing optical unit 3. Thus optical fibers 21 and 22 respectively function as a laser emitting section and a laser receiving section in the laser optical device related to the present invention. Meanwhile, as the laser emitting section, optical fiber 21 can be substituted by LD also, as the laser receiving section, optical fiber 22 can be substituted by a light waveguide. Here, for example, in case of the optical fiber, size of the incident surface is 10 μm in a diameter and in case of the light waveguide the size of the incident surface is 2 μm×1 μm.

Half mirror 5 reflects a portion of the laser light emitted by emission surface 22b of optical fiber 22 and conducts it to photodiode 6.

Photodiode 6 representing a light intensity detection section in the present invention detects an intensity of the laser light conducted by half mirror 5 and converts it into an electric signal.

Control section 7 changes a position of light condensing optical unit 3 through actuators 8 and 9 based on the intensity of the laser light detected by photodiode 6 and controls actuators 8 and 9 so that the laser light conducted by light condensing optical unit 3 is directed to a center of incident surface 22a of optical fiber 22. Meanwhile, details of control of actuators 8 and 9 by the control section are described later.

Actuators 8 and 9 are provided with electromechanical transducer 811, which is a lamination layer type to be described or a role type, driving axis 812 representing vibration member of the present invention which is fixed so as to be able to vibrate with electromechanical transducer 811 and moving member 814 which is engaged with driving axis 812 so as to move light condensing optical unit 3 mounted on moving member 814. Actuator 8 is able to move light condensing optical unit 3 in one axis direction (X-axis direction) on a plane perpendicular to the light axis and actuator 9 is able to move light condensing optical unit 3 in a Y-axis direction perpendicular to the X-axis direction on the plane perpendicular to the light axis. Meanwhile, a configuration of actuators 8 and 9 are described later.

Figure 2:
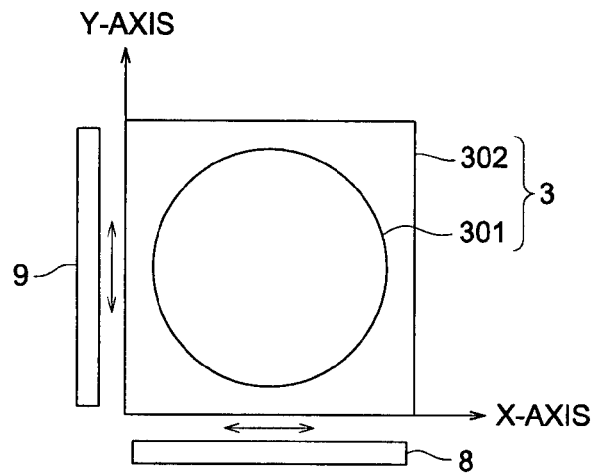
FIG. 2 is a configuration diagram of a laser optical device related to the present invention in X-Y stage.

Next, a configuration of light condensing optical unit 3 and an arrangement of actuators 8 and 9 are described with reference to FIG. 2. FIG. 2 is a configuration diagram of X-Y stage configured with light condensing optical unit 3 and actuators 8 and 9.

As FIG. 2 shows, light condensing optical unit 3 has condenser lens 302 and lens holder 302 to retain condenser lens 301 and is supported through actuators 8 and 9 so as to be able to move in X-axis direction and Y-axis direction.

Next, a configuration of actuators 8 and 9 are described with reference to FIG. 3. FIG. 3 (a) is a configuration diagram of a truss type actuator provided with a laminated layer type electromechanical transducer, FIG. 3 (b) is a configuration diagram of an element fixed type actuator where an electromechanical transducer is fixed, and FIG. 3 (c) is a configuration diagram of an axis fixed type actuator where the drive axis is fixed. Each of the truss type actuator, the element fixed type actuator and the axis fixed type actuator is a widely known actuator which provides the vibration member vibrates along with the electromechanical transducer. In the embodiment of the laser optical device related to the present invention, while the actuators having such vibration members can be used, an out line of a configuration of the element fixed type actuator is described here. Meanwhile, since details of the element fixed type actuator is disclosed, for example, in Patent Document 2002-185055 (Voltage conversion element), a detailed description is omitted here. Also, since a configuration of actuator 9 is the same as that of actuator 8, the description is omitted.

As FIG. 3 (b) shows, element fixed type actuator 8 is provided with electromechanical transducer 811, drive axis 812, weight 813 and moving member 814, and weight 813 is fixed onto a housing. Control section 7 inputs a driving signal into electromechanical transducer 811 to generate wobbling and to vibrate drive axis 812 in an arrow A direction, thereby relative movement is caused between drive axis 812 and moving member 814 which is engaged with drive axis 812 through a friction force. Meanwhile, lens holder 302 represents moving member 814.

Figure 4:
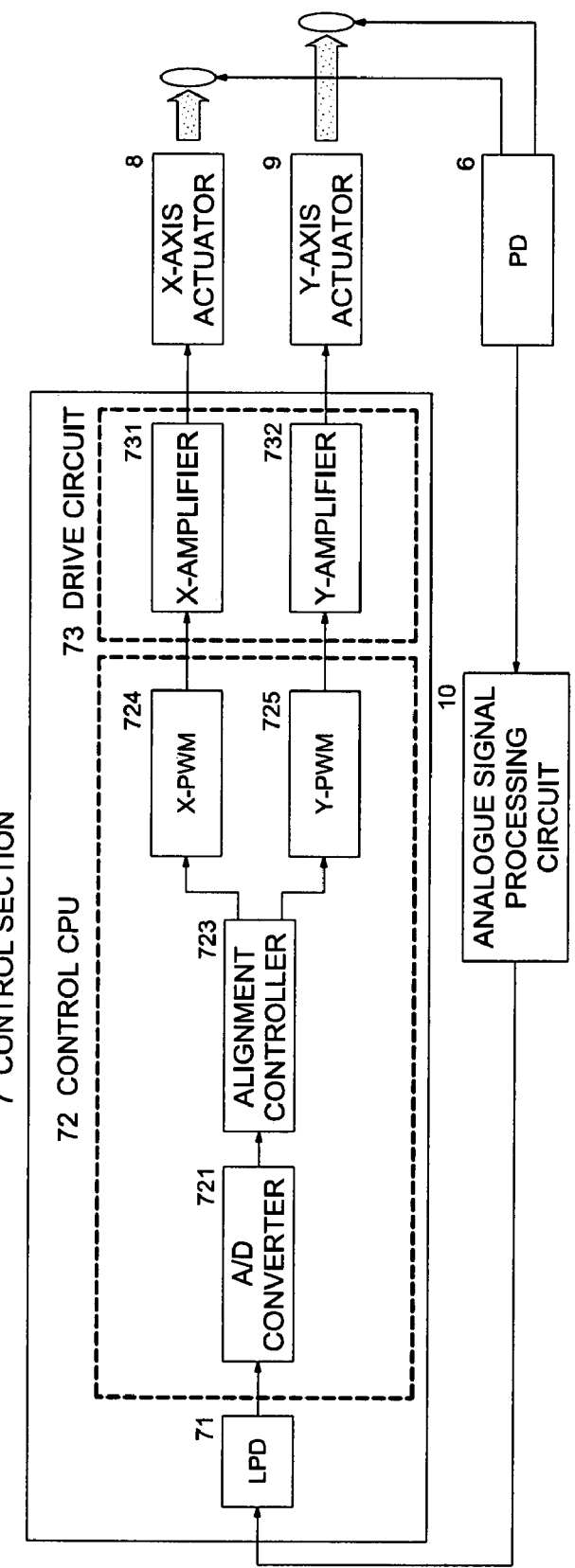
FIG. 4 is a block diagram of an electric circuit of a laser optical device related to the present invention.

Next, a configuration of an electric circuit of laser optical device 1 is described with reference to FIG. 4. FIG. 4 is a block diagram of an electric circuit of laser optical device 1.

A critical portion of electric circuit block of laser optical device 1 is configured with analogue signal processing circuit 10, control section 7 and so forth.

Analogue signal processing circuit 10 converts an electric current which is converted according to the intensity of the laser light detected through photodiode 6 into a voltage signal.

Control section 7 is configured with control CPU 72 having low pass filter 71, A/D converter 721, alignment controller 723, X-PWM724 and Y-PWM725, and driving circuit 73 having X-amplifier 731 and Y-amplifier 732.

Low pass filter 71 eliminates a high frequency noise included in the voltage signal outputted from analogue signal processing circuit 10.

A/D converter 721 converts the voltage signal outputted from low pass filter 71 into a digital signal.

Alignment controller 723 implements rectangular wave phase detection on a digital signal sampled by A/D converter 721 and sets three parameters of the drive signal (drive plus) to drive actuators 8 and 9, namely a driving frequency, a duty rate and a value of pulse number based on a result of rectangular wave phase detection. Meanwhile, details of procedures of rectangular wave phase detection and parameter setting are described later.

X-PWM 724 and Y-PWM 725 generates a drive pulse to drive actuators 8 and 9 in the X-axis direction and Y-axis direction respectively based on three parameters set by alignment controller 723.

Figure 6:
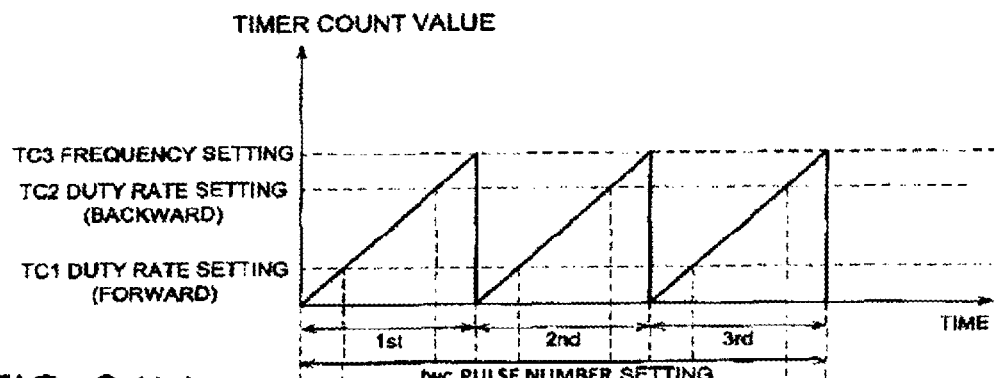
FIG. 6 is a time chart of a drive signal of an actuator of a laser optical device related to the present invention.
Figure 6:
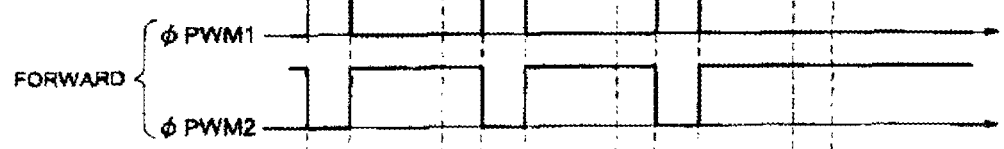
Figure 6:
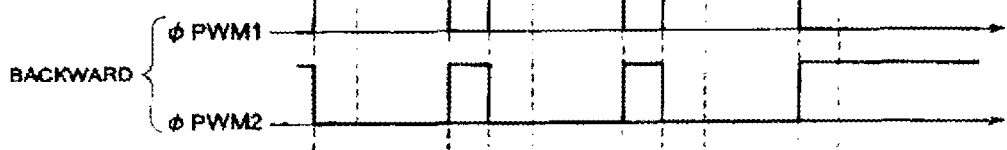

Here, a parameter setting procedure conducted by alignment controller 723 and operations of X-PWM 724 and Y-PWM 725 are described with reference to FIG. 6. FIG. 6 (a) is a figure showing three parameters, FIG. 6 (b) is a time chart showing a drive pulse for forward moving, generated based on three parameters set, and FIG. 6 (c) is a time chart showing a drive pulse for backward moving generated based on three parameters set.

Alignment controller 723 is provided with an unillustrated time counter to count time and sets a threshold TC3 of the time counter based on a digital signal sampled by A/C converter 721. As FIG. 6 shows, the time counter is reset at threshold TC3 set and repeats counting of time. Thereby a time count wave has a triangle shape and a frequency of this triangle wave becomes a frequency of the drive plus. Next, alignment controller 723 sets thresholds TC1 and TC2 based on the digital signal sampled by A/D converter 721. With these thresholds TC1 and TC2, a period of time where the drive pulse is ON, namely a duty rate is set. Also in the same manner, Alignment controller 723 sets measuring time twc of the time counter based on the digital signal sampled by A/D converter 721. Thereby number of pulses of the drive pulse is set.

As above, when thresholds TC3, TC2 and TC3 and twc are set by alignment controller 723, as FIGS. 6 (b) and (c) shows, X-PWM 724 and Y-PWM 725 generate a drive frequency, the duty rate, based on TC3, TC1 and TC2, and twc as well as drive pulses PWM1 and PWM2 for forward and backward moving based on the number of the plus. Meanwhile, FIG. 6 (a) to (c) show a time chart in case the number of pulse set is 3.

Figure 5:
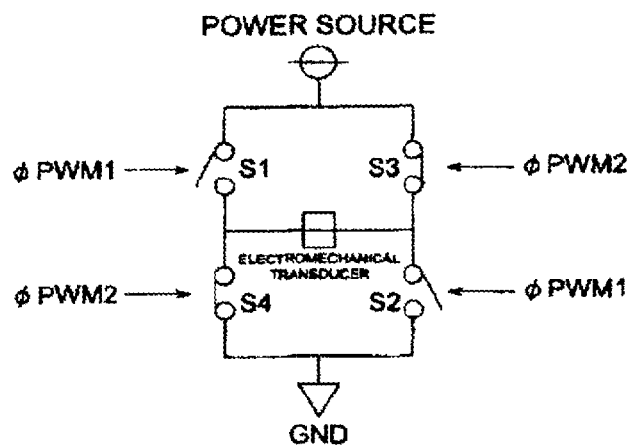
FIG. 5 is a frame format showing a drive circuit of an actuator of a laser optical device related to the present invention.

Returning to FIG. 4, X-amplifier 731 and Y-amplifier 732 are respectively provided with widely known H bridge circuit shown in FIG. 5 and amplify the drive pulse generated by X-PWM 724 and Y-PWM 725 so as to drive actuator 8 and 9.

In laser optical device 1 having such configuration, control section 7 sets values of three parameters to drive actuators 8 and 9 based on the intensity of the laser light detected by photodiode 6 namely, a result of rectangular wave phase detection of the digital signal sampled by A/D converter 721. Thereafter, control section 7 drives actuators 8 and 9 by the drive pulse based on the three parameters set and changes a position of light condensing optical units 3 so that the laser light conducted by light condensing optical units 3 is directed to the center of incident surface 22a of optical fiber 22. Meanwhile such a successive operation is called "Wobbling".

Here, rectangular wave phase detection implemented by control section 7 is described with reference to FIG. 7. FIG. 7 (a) is a profile of the laser light projected on incident surface 22a of optical fiber 22 in a X-axis direction, FIG. 7 (b) is a frame format showing rectangular wave phase detection procedure. Meanwhile, rectangular wave phase detection procedure in Y-axis direction is omitted since it is the same as that in X-axis direction.

For example, here, as FIG. 7 (a) shows, rectangular wave phase detection starts when a position of the laser light conducted by light condensing optical unit 3 on incident surface 22a of optical fiber 22 is at X0, and the intensity of the laser light detected by photodiode 6 at this moment is P0. Meanwhile, a vibration altitude of the rectangular wave for rectangular wave phase detection is equivalent to two pulses in drive pulses φ PWM1 and φ PWM2 shown in the aforementioned FIG. 6.

First, light condensing optical unit 3 moves in a positive direction by two pulses and stops. At this stage, a position of the laser light moves from X0 to X1 and an intensity of the laser light changes from P0 to P1. A/D converter 721 samples the intensity of the laser light P1 for a predetermined period of time and alignment controller 723 integrates the intensity of the laser light P1 sampled. An integrated intensity of the laser light is shown in FIG. 7 (b) as PI1. Next, light condensing optical unit 3 moves in a negative direction by four pulses and stops. In this moment, the position of the laser light moves from X1 to X2 and the intensity of the laser light changes form P1 to P2. A/D converter 721 samples the intensity of the laser light for a predetermined period and alignment controller 723 integrates the intensity of the laser light P2 sampled. An integrated intensity of the laser light is shown in FIG. 7 (b) as PI2. Next, light condensing optical unit 3 moves in a positive direction by two pulses and stops. Then a difference between integrated values PI1 and PI2 obtained at each position is calculated. The difference is shown in FIG. 7 (b) as ΔPI. Meanwhile, the difference ΔPI is hereinafter called rectangular wave phase detection output.

Here, the rectangular wave phase detection output ΔPI is explained with reference to FIG. 8. FIG. 8 (a) is a profile in X-axis direction of the laser light projected on incident surface 22a of optical fiber 22 and FIG. 8 (b) is a frame format showing rectangular wave phase detection output ΔPI corresponding to the profile shown in FIG. 8 (a). As FIG. 8 (b)

shows, at a position where the intensity of the laser light becomes maximum namely at the center of incident surface 22a of optical fiber 22, the rectangular wave phase detection output ΔPI becomes 0, and on left side and right side of a position where the intensity of the laser light becomes maximum, ΔPI shows negative and positive values.

Returning to FIG. 7, rectangular wave phase detection output ΔPI obtained in the above is multiplied by a predetermined coefficient (gain) to obtain a compensation value (compensation pulse number) and light condensing optical unit 3 is moved by the compensation pulse number obtained. Then such operation is repeated so that rectangular wave phase detection output ΔPI come close to 0. Namely, control is implemented so that the laser light conducted by light condensing optical unit 3 is directed to the center of incident surface 22a of optical fiber 22.

Figure 9:
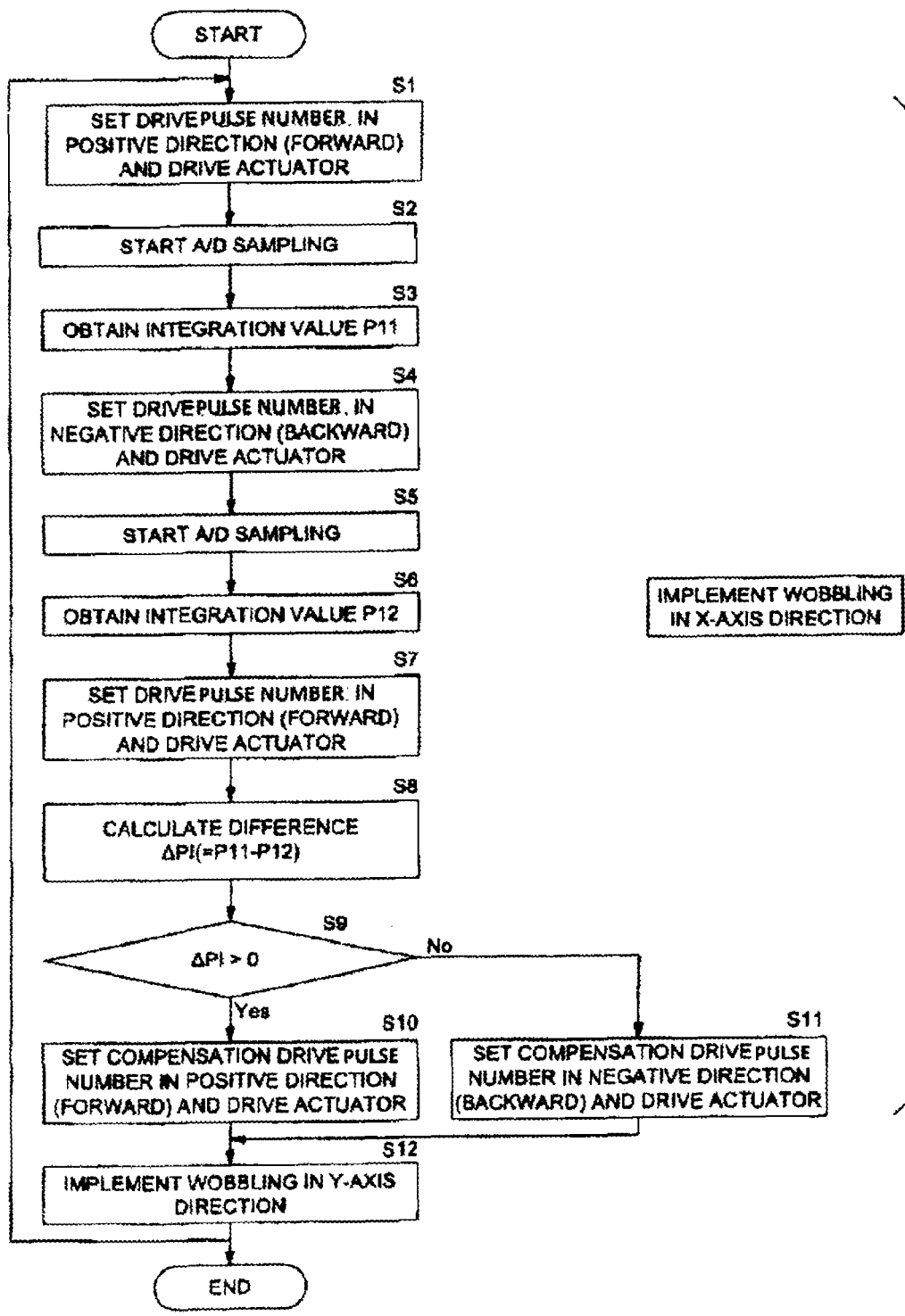
FIG. 9 is a flow chart showing a flow of wobbling operation of a laser optical device related to the present invention.

Next, a flow of wobbling operation is explained with reference to FIG. 9 and FIG. 10. FIG. 9 is a flow chart showing a flow of the wobbling operation. FIG. 10 is a time chart of wobbling operation.

First, wobbling operation is implemented in the X-axis direction. Now, alignment controller 723 sets a drive pulse number (for example two pluses) in a positive direction (forward direction) to implement wobbling operation in period tw1 shown in FIG. 10 (a), and moves light condensing optical unit 3 by two pulses in the positive direction through actuator 8 (step S1). Then light condensing optical unit 3 is stopped and a position of the laser light on incident surface 22a of optical fiber 22 becomes stable, here, A/D converter 721 starts sampling (step S2) and then alignment controller 723 integrates the intensity of the laser light sampled by A/D converter 721 within period tw2 so as to obtain integrated value PI1 (step 3). Next, alignment controller 723 sets a drive pulse number (for example 4 pluses) in a negative direction (backward direction) within period tw3 to move light condensing optical unit 3 by four pulses in the negative direction of the X-axis through actuator 8 (step S4). Then light condensing optical unit 3 is stopped and the position of the laser light on incident surface 22a of optical fiber 22 becomes stable, then in the same manner as step S2 and step S3, A/D converter 721 starts sampling (step S5) and then alignment controller 723 integrates the intensity of the laser light sampled by A/D converter 721 in period two so as to obtain integrated value PI2 (step 6). Then, alignment controller 723 sets a drive pulse number (for example 2 pluses) of the positive direction (forward direction) in period tw5, and moves light condensing optical units 3 in the positive direction of X-axis by two pulses (step S7).

Meanwhile, in step 4, when light condensing optical unit 3 is moved in the negative direction of the X-axis by 4 pluses, in order to suppress a fluctuation of a moving amount per pulse at a transient period of starting of actuator 8, at the beginning, the light condensing optical unit is driven by two pulses then it is stopped once and then driven by the remaining two pluses.

In this way, after integrated values PI1 and PI2 are obtained, alignment controller 723 subtracts integrated value PI2 from the value PI1 in the period of tw6 to obtain difference ΔPI (step S8) and judges if a value of difference ΔPI is positive or negative (step S9). In case the value of difference ΔPI is positive (step S9; Yes), since a position where the intensity of the laser light projected on incident surface 22a of optical fiber 22 becomes maximum is exist further in the positive direction (forward direction), alignment controller 723 calculates the compensation amount (compensation pulse number) in the positive direction (forward direction) by multiplying the difference ΔPI by the predetermined coefficient (gain), and moves light condensing optical unit 3 by the compensation pulse number obtained in the positive direction of the X-axis through actuator 8 (step S10). On the other hand, in step 9, in case the value of difference ΔPI is negative (step S9; No), since a position where the intensity of the laser light projected on incident surface 22a of optical fiber 22 becomes maximum is exist further in the negative direction (backward direction), alignment controller 723 calculates the compensation amount (compensation pulse number) in the negative direction (backward direction) in the same manner as in step 10, and moves light condensing optical unit 3 by the compensation pulse number obtained in the negative direction of the X-axis through actuator 8 (step S11).

In this way, when one cycle of wobbling operation in the X-axis direction in period twX is completed, in the same manner as steps S1 to S11, wobbling operation in the Y-axis direction in period twY shown by FIG. 10 (b) is implemented for one cycle (step S12). Then by repeating such wobbling in the X-axis direction and Y-axis direction sequentially, difference ΔPI becomes 0, in other words, the laser light conducted by light condensing optical unit 3 is directed to the center of incident surface 22a of optical fiber 22.

Meanwhile, in the aforesaid embodiment, the wobbling operation in X-axis direction and Y-axis direction is implemented alternatively by changing them over sequentially, therefore, for example, while wobbling operation in the X-direction is being implemented, since the position of the laser light on incident surface 22a of optical fiber 22 in the Y-direction is held, a fluctuation of the laser light caused by positional change of the laser light in Y-direction do not occur, thus positional control of the laser light in X-axis direction can be implemented with high accuracy. Also, wobbling operation in the X-axis direction and Y-axis direction can be implemented simultaneously provided that the frequency of wobbling operation satisfies a specific relation.

Embodiment 2

Next embodiment 2 of laser optical device 1 is explained. Since a main structure of embodiment 2 is the same as that of the aforesaid embodiment 1, detailed description is omitted and wobbling operation in the X-axis having a different sequence from that of embodiment 1 and a timing of dithering operation in the Y-direction is described.

In the laser optical device 1 of embodiment 1, while the wobbling operations in the X-axis and Y-axis directions are implemented alternatively in sequence by changing them over, in laser optical device 1 of embodiment 2, wobbling operations in the X-axis direction and Y-axis direction are implemented simultaneously by satisfying a specific relation in wobbling operation frequency.

In practice, it is explained with reference to FIG. 11. FIG. 11 is a time chart of other example of wobbling operation.

Here, when a frequency of wobbling operation in the X-axis is f1 and that of in the Y-axis is f2, values to satisfy the following formula are assigned to f1 and f2:

$$f1 = 2 \times n \times f2$$

$$f2 = 2 \times n \times f1$$

Note: n is an integral number

Thus, for example, if frequency f2 of wobbling operation in the Y-axis direction is two times frequency f1 of wobbling operation in the X-axis direction, as FIG. 11 (b) shows, since a position of the laser light in the X-axis direction on incident surface 22a of optical fiber 22 is held as shown in FIG. 11 (a), while wobbling operation in the Y-axis direction is being implemented, the fluctuation of the light intensity caused by positional change of the laser light in the X-axis direction does not occur. Therefore, positional control of the laser light in the Y-axis direction can be implemented highly accurately without being affected by wobbling operation in the X-axis direction. As a result, wobbling operation in the X-axis direction and wobbling in the Y-axis direction can be implemented simultaneously, thus wobbling operation is implemented in high speed.

Figure 12:
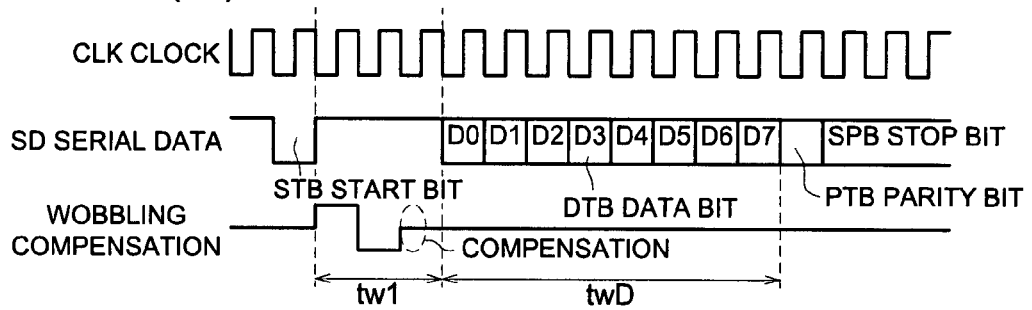
FIG. 12 is a time chart of wobbling operation for serial data.
Figure 12:
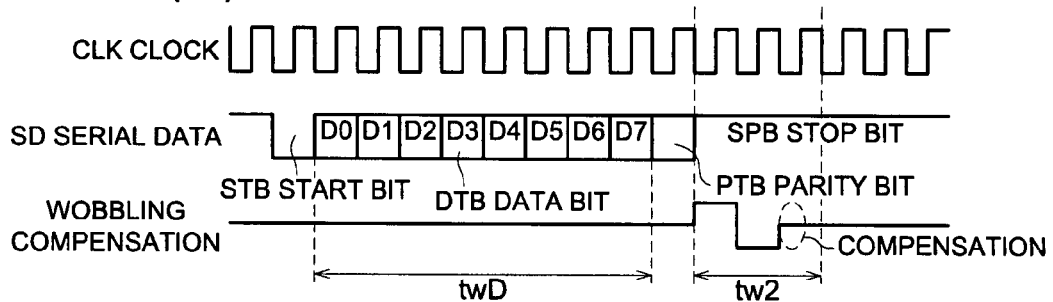
Figure 12:
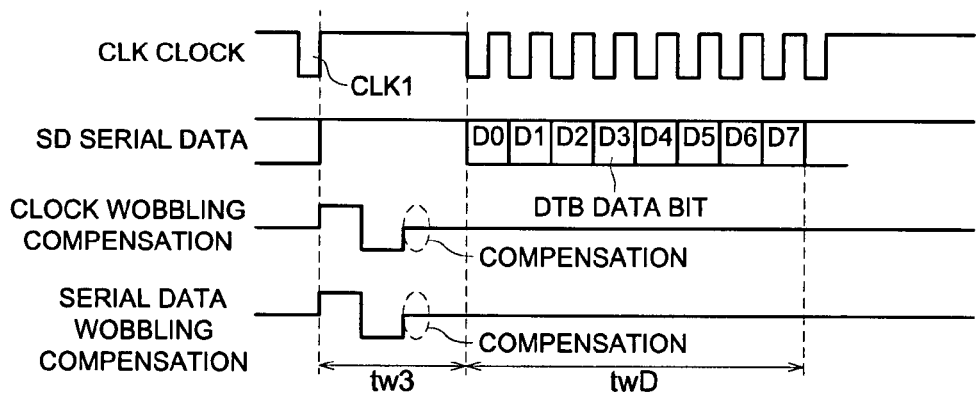

Next, in laser optical device 1 having the aforesaid structure, a timing of wobbling operation for a laser signal light modulated by communication information is described with reference to FIG. 12. FIG. 12 (a) is a timing chart showing an example of a timing of wobbling operation implemented for asynchronous serial communication data, FIG. 12 (b) is a timing chart showing the other example of a timing of wobbling operation implemented for asynchronous serial communication data, and FIG. 12 (c) is a timing chart showing an example of a timing of wobbling operation implemented for clock synchronous serial communication data.

First, an example of a timing of wobbling operation implemented for the asynchronous serial communication data is described with reference to FIG. 12(a).

As FIG. 12 (a) shows, asynchronous serial communication data SD is configured with start bit STB, data bit (data signal) DTB, parity bit PTB and stop bit SPB, and is provided with period tw1 between start bit STB and data bit (data signal) DTB to output a high level for a predetermined period.

In respect to serial data SD having the aforesaid structure, wobbling operation is implemented within period tw1 synchronizing with start bit STB representing a control signal in the present invention.

Next, the other example of a timing of wobbling operation implemented for the asynchronous serial communication data is described with reference to FIG. 12(b).

As FIG. 12 (b) shows, asynchronous serial communication data SD is configured with start bit STB, data bit (data signal) DTB, parity bit PTB and stop bit SPB, and is provided with period tw2 to output a high level for a predetermined period following stop bit SPB.

In respect to serial communication data SD having such structure, wobbling operation is implemented within period tw2 synchronizing with stop bit STB representing the control signal in the present invention.

Next, a timing of wobbling operation implemented for the clock synchronous serial communication data and a clock is described with reference to FIG. 12 (c).

As FIG. 12 (c) shows, clock synchronous serial communication data SD and clock CLK are provided with period tw3 to output high level for a predetermined period of time, synchronizing with arbitrary clock CLK1 before data bit (data signal) DTB is outputted.

For clock synchronous serial communication data SD and clock CLK having such structure, wobbling operation is implemented within period tw3 synchronizing with clock CLK1.

As above, in laser optical device 1 related to the present invention, in case wobbling operation is implemented for the laser signal light modulated by serial communication data, laser optical device is configured so that wobbling operation is implemented within periods tw1, tw2 and tw3 which are synchronized with start bit STB, Stop bit SPB or clock CLK1 included in serial communication data SD. Therefore, since wobbling operation is not implemented and drive of actuators 8 and 9 is ceased in period twD where data bit (data signal) DTB included in serial communication data SD, is being outputted, a position of light condensing optical units 3 is fixed. Thereby, data bit (data signal) DTB can be propagated accurately without being affected by the fluctuation of the intensity of the laser signal light due to wobbling operation. Also, since wobbling operation is not implemented continuously and operated only in periods tw1, tw2, and tw3, an increase of electric power consumption is suppressed.

Figure 13:
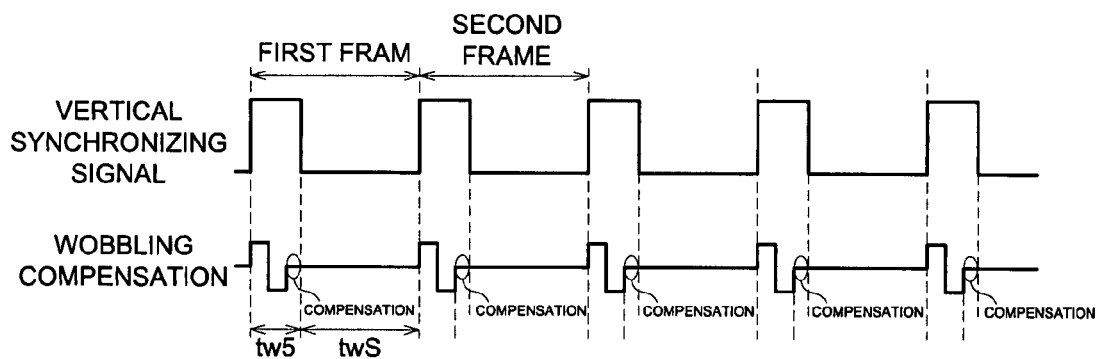
FIG. 13 is a time chart of wobbling operation for an image signal.
Figure 13:
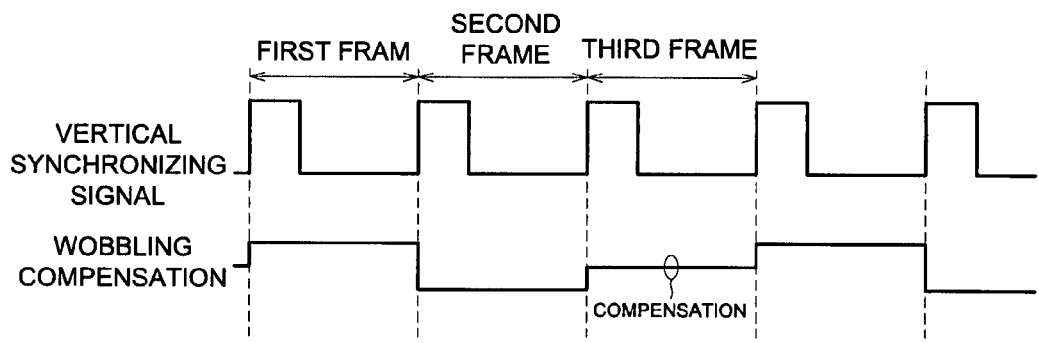

Next timing of wobbling operation implemented for the laser signal light modulated by image data is described with reference to FIGS. 13 (a) and (b). FIG. 13 (a) is a timing chart of an example of a timing of wobbling operation implemented for the image data. FIG. 13 (b) is a time chart of the other example of timing of wobbling operation implemented for the image data.

First, an example of a timing of wobbling operation implemented for the image data is described with reference to FIG. 13 (a).

As FIG. 13 (a) shows, wobbling operation is implemented while a vertical synchronous signal is being outputted, synchronizing with the vertical synchronous signal. Thus, since wobbling operation is not implemented and drive of actuators 8 and 9 is ceased within period twS where the mage signal (data signal) is being outputted, light condensing optical unit 3 is fixed. Therefore, the image signal (data signal) can be propagated accurately without being affected by the fluctuation of the intensity of the laser signal light due to wobbling operation. Also, one cycle of wobbling operation is completed for every frame, thus the position of the laser signal light, namely the intensity is appropriately controlled and the image signal (data signal) having preferable S/N ratio can be obtained. Meanwhile, wobbling operation can be implemented within a vertical flyback period instead of vertical synchronous signal VD or within a period where a horizontal synchronous signal is being outputted.

Next, other example of a timing of wobbling operation implemented for image data is described with reference to FIG. 13 (b).

As FIG. 13 (b) shows, light condensing optical unit 3 is moved, for example, in the positive direction in the first frame, synchronizing with vertical synchronous signal VD and moved in the negative direction in the second frame. Then in the third frame, it is moved by an amount of compensation based on rectangular wave phase detection output ΔPI obtained in the first and second frame. In this way, by implementing one cycle of wobbling operation through three frames, a period of rectangular wave phase detection can be prolonged. Thus by implementing one cycle of positioning across a plurality of periods, the S/N ratio of the rectangular wave phase detection can be improved.

As above, in laser optical device 1 related to the present invention, for the laser signal light modulated by the communication data or the image data, in case control is implemented so that the laser signal light is directed to the center of incident surface 22a of optical fiber 22, actuators 8 and 9 are driven within periods tw1, tw2, tw3 and tw5 which are synchronizing with, for example, start bit STB, stop bit SPB, arbitral clock CLK1, or vertical synchronous signal VD. Therefore, since drive actuators 8 and 9 is ceased while data signals such as data bit DTB included in the communication data or the image data, or the image signal, the position of light condensing optical unit 3 is fixed. Thereby, the data signal such as data bit DTB and the image signal can be propagated accurately without being affected by the fluctuation of the intensity of laser signal light caused by wobbling operation. Also, he increase of the power consumption can be suppressed.

Also laser optical device 1 of the present invention is provided with electromechanical transducer 811, vibration member (drive shaft 812) which is fixed so as to vibrated with electromechanical transducer 811 and moving member 814 engaged with the vibration member by a friction force, wherein the laser signal light is controlled so as to be directed to the center of incident surface 22a of the optical fiber 22 using actuators 8 and 9 to move light condensing optical unit 3 mounted on moving member 814. Thus, since light condensing optical unit 3 is moved by the vibration member (drive shaft 812) capable of wobbling positional control in sub-micron order with high resolution and high accuracy is possible, and high performance can be maintained all the time. Also, since actuators 8 and 9 moves light condensing optical unit 3 by friction engagement, light condensing optical unit 3 can maintain the posture while a supply of electricity is ceased and drive is ceased. Thus light condensing optical unit 3 can be fixed easily without causing the increase of power consumption.

In the above, the present invention has been described with reference to the embodiments without the present invention being restricted thereto, and it is to be understood that modification and improvement may be made.

Figure 14:
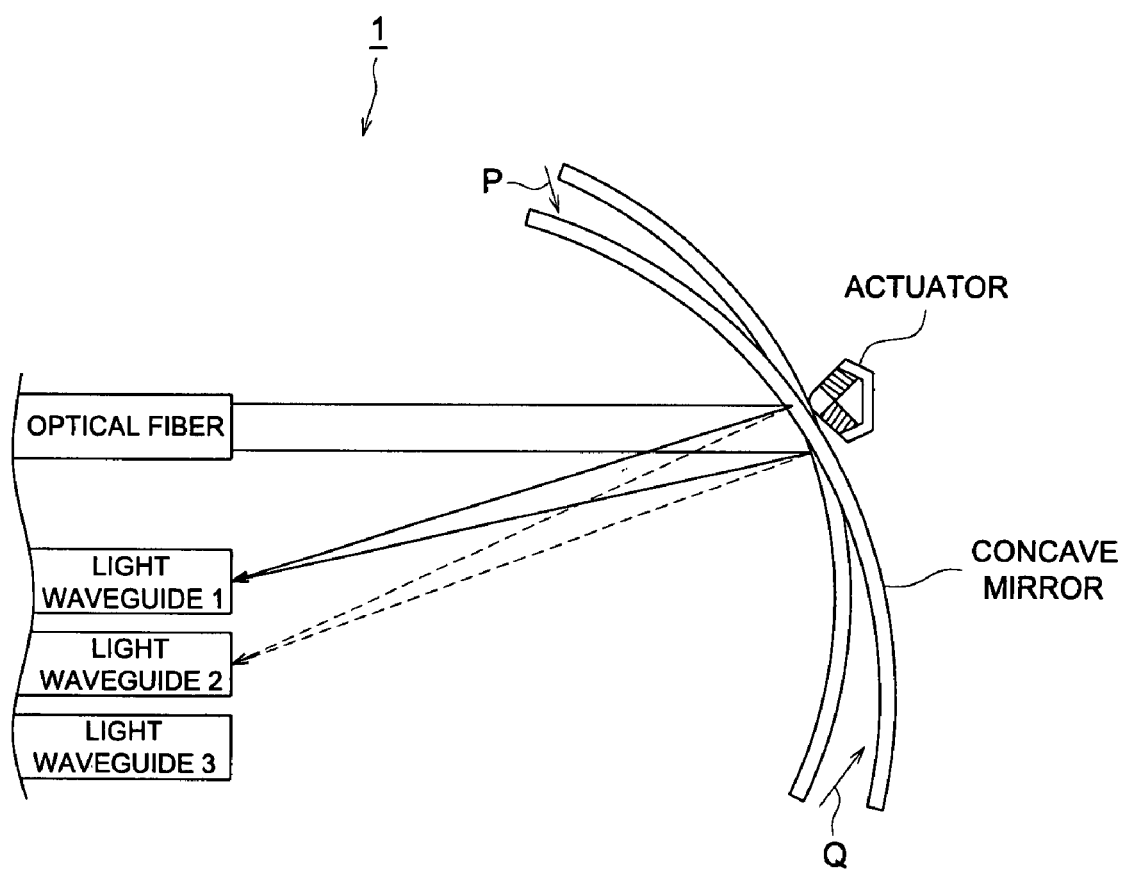
FIG. 14 is an outline of a configuration diagram of the other example of a laser optical device related to the present invention.

For example, in the aforesaid embodiments, while the laser light emitted from optical fiber 21 is condensed by condensing lens 301 towards the incident surface 22a of optical fiber 22, a concave mirror representing a reflective optical element of the present invention can be utilized instead of condensing lens 301. Specifically, it is described with reference to FIG. 14. FIG. 14 is a schematic view of a structure showing an embodiment of other example of the laser optical device related to the present invention. As FIG. 14 shows, the concave lens is disposed on an optical axis of the laser light emitted from an optical fiber and is fixed to be able to wobble centering around a point where an optical axis of the laser light emitted from the optical fiber intersects with the concave mirror, integrally with an unillustrated light condensing unit. The laser light emitted from the optical fiber is reflected by the concave mirror and conducted by a light waveguide selected from light waveguides 2 to 3 to be condensed. Then, in the same manner as the aforesaid embodiments, the light condensing optical unit is rotated in P and Q directions centering around the point where the laser light intersect with the concave mirror, through the actuator and is controlled so that the laser light conducted by concave mirror is directed to the center of the incident surface of the light waveguide. Thereby, the position of the laser light on the incident surface to the light waveguide can be changed easily without making the device complicated.

According to the above embodiments, positioning of the laser signal light conducted by the light condensing optical unit and the laser light receiving section is carried out by moving the light condensing optical unit through the actuator which is driven in the predetermined period of time synchronizing with the predetermined signal included in the laser signal light. Namely, in the laser signal light modulated by the information such as the communication data and the image data, in case control is conducted so that the laser signal light is directed to the incident surface of the laser light receiving section, the actuator is driven in the period which is synchronized with the control signal, for example, the start bit or the stop bit, included in the information such as the communication data or image data. Therefore, since the drive of the actuator is ceased while the data signal included in the communication data or the image data is being outputted, the position of the light condenser optical unit is fixed, thereby the data signal is propagated accurately without being affected by the change of intensity of laser signal light for positioning control operation. Also, the positioning control operation is not operated continuously and, for example, it is operated only while the control signal or synchronizing signal is being outputted, thus the increase of power consumption is suppressed.

Also, the actuator has the electromechanical transducer and the vibration member fixed onto the electromechanical transducer so as to vibrate with the electromechanical transducer, the moving member which is in contact with the vibration member with a friction wherein the positioning of the laser signal light conducted by the light condenser optical unit and the laser light receiving section is implemented by moving the light condenser optical unit mounted on the moving member. Thus, since the light condenser optical unit is moved by the vibration member capable of wobbling, positioning control with a high resolution and a high accuracy in sub-micron order is possible, then high performance can be maintained all the time. More importantly, since the actuator uses a friction contact to move the light condensing optical unit, the light condensing optical unit can maintain it position while drive is ceased by ceasing the power supply to the actuator. Thereby, a position of the light condensing optical unit can be fixed easily without increasing the power consumption.

Also, the actuator is configured to be operated by the pulse signal. Thus stepping drive is possible and positioning control can be carried out with a high accuracy.

Also, the light condenser optical unit is configured to be provided with a refraction optical element and reflection optical element. Thus a position of the laser light on the incident surface of the laser light receiving section can be changed without making the device complicated.

Further, the control section is configured to implement the first wobbling operation and the second wobbling operation alternatively. Therefore, for example, while the first wobbling operation is being carried out, the position of the laser light in the second direction on the incident surface of the laser light receiving section is held, thus the intensity of the laser light is not changed because the position of laser light in the second direction is not changed thereby positioning control in the first direction of the laser light can be carried out with high accuracy.

Also, when a frequency of the first wobbling operation is f1 and a frequency of the second wobbling operation is f2, f1 and f2 satisfy the following relation described by formula 1 or formula 2, and the control section is configured to conduct a first wobbling operation and a second wobbling operation simultaneously.

$$F1 = 2 \times n \times f2 \qquad \text{(formula 1)}$$

$$F2 = 2 \times n \times f1 \qquad \text{(formula 2)}$$

Note: n in the above formulas is positive integers.

Thereby, for example, when the frequency f1 of the first wobbling operation is a relation that the frequency f1 is a multiple of the frequency of the second wobbling operation by even number, the position of the laser light in a second direction on the incident surface for the laser light receiving section is held, while the first wobbling is implemented, thereby the intensity of the laser light is not changed because the position of the laser light in the second direction is not changed. Thereby the positioning control of the laser light in the first direction can be carried out highly accurately without being affected by the second wobbling operation. As a result, the first wobbling operation and the second wobbling operation can be implemented simultaneously and wobbling operation becomes faster.

What is claimed is:

1. A laser optical device, comprising:
 a laser light emitting section to emit laser signal light modulated by information;
 a laser light receiving section to receive the laser signal light emitted from the laser light emitting section;
 a light condensing optical unit to conduct the laser signal light emitted from the laser light emitting section to the laser light receiving section;
 an actuator to move the light condensing optical unit;
 a light intensity detecting section to detect an intensity of the laser signal light conducted to the laser light receiving section; and
 a control section to control drive of the actuator so as to align the laser signal light conducted by the light condensing optical unit to the laser light receiving section;
 wherein in a cycle the actuator, having an electromechanical transducer and a vibration member to generate wobbling by excitation of the electromechanical transducer in contact with the light condensing optical unit so that the light condensing optical unit is moved by a friction force created between the vibration member and the light condensing optical unit, implements a first wobbling operation where the control section moves the light condensing optical unit with a predetermined frequency in a cycle in a first moving direction and a second wobbling operation where the light condensing optical unit is moved in a second moving direction which is perpendicular to the first moving direction with a predetermined frequency, and
 wherein f1 representing a frequency of the first wobbling and f2 representing a frequency of the second wobbling operation satisfy a relation described by a formula 1 or formula 2 below, and the control section controls the actuator to implement the first wobbling and second wobbling simultaneously;

$$f1 = 2 \times n \times f2 \qquad \text{Formula 1}$$

$$f2 = 2 \times n \times f1; \qquad \text{Formula 2}$$

where n is a positive integer.

2. The laser optical device of claim 1, wherein the actuator has the electromechanical transducer, the vibration member which is fixed so as to vibrate with the electromechanical transducer and moving member engaged with the vibration member by friction, and the light condensing optical unit is mounted on the moving member.

3. The laser optical device of claim 1, wherein the actuator is driven by a pulse signal from the control section.

4. The laser optical device of claim 1, wherein the light intensity detection section detects the intensity of the laser light while the actuator remains stationary.

5. The laser optical device of claim 1, wherein the information is communication data or image data.

6. The laser optical device of claim 1,
 wherein the control section drives the actuator in a predetermined period which is synchronized with a predetermined signal included in the laser signal light.

7. The laser optical device of claim 1,
 wherein the control section drives the actuator in a predetermined period which is synchronized with a predetermined signal included in the laser signal light and the information is communication data or image data.

8. The laser optical device of claim 6, wherein the predetermined signal is a control signal included in the information.

9. The laser optical device of claim 6, wherein the predetermined signal is a synchronous signal included in the information.

10. The laser optical device of claim 6, wherein
 the predetermined signal is outputted repeatedly in a constant cycle, and the control section controls the actuator so that the light condensing optical unit reciprocates with a minute amplitude in each predetermined period synchronizing with the predetermined signal.

11. The laser optical device of claim 6, wherein a predetermined signal is outputted repeatedly in a constant cycle, and the control section drives the actuator so that the light condensing optical unit implements one cycle of positioning within at least two adjacent predetermined periods which are synchronized with the predetermined signal.

12. The laser optical device of claim 1, wherein the light condensing optical unit is provided with a refraction optical element having power disposed on an optical axis of the laser light emitted from the laser light emitting section, and the actuator moves the light condensing unit along a surface perpendicular to the optical axis of the laser light.

13. The laser optical device of claim 1, wherein the light condensing optical unit is provided with a reflection optical element having power disposed on an optical axis of the laser light emitted from the laser emitting section and fixed to be able to wobble integrally with the light condensing optical unit centering around a point where the optical axis of the laser light emitted from the laser light emitting section intersects with the light condensing optical unit.

14. A control method of controlling operation of an actuator wherein the actuator is controlled so that laser light emitted from a laser emitting section is directed to a center of an incident surface of a laser light receiving section by moving a light condensing optical unit which conducts the laser light to the laser light receiving section, and wherein the actuator has an electromechanical transducer and a vibration member which generates wobbling by excitation of the electromechanical transducer, in contact with the light condensing unit so that a friction force acts on the light condensing optical unit directly or indirectly, comprising steps of: detecting an intensity of the laser light conducted to the laser light receiving section while drive of the actuator is being ceased; first wobbling operation to move the light condensing unit in a first moving direction with a predetermined frequency in a cycle based on the intensity of the laser light detected in the detection step; and second wobbling operation to move the light condensing unit in a second moving direction perpendicular to the first moving direction with a predetermined frequency in a cycle; wherein f1 representing a frequency of the first wobbling and f2 representing a frequency of the second wobbling operation satisfy a relation described by formula 1 or formula 2 below, and the control section controls the actuator to implement the first wobbling and second wobbling simultaneously:

$$f1 = 2 \times n \times f2 \qquad \text{Formula 1}$$

$$f2 = 2 \times n \times f1 \qquad \text{Formula 2}$$

(Note: n is a positive integer).

* * * * *

UNITED STATES PATENT AND TRADEMARK OFFICE
CERTIFICATE OF CORRECTION

PATENT NO. : 7,941,051 B2
APPLICATION NO. : 11/827711
DATED : May 10, 2011
INVENTOR(S) : Kazuhiro Shibatani, Yoshiaki Hata and Shingo Kanezawa It is certified that error appears in the above-identified patent and that said Letters Patent is hereby corrected as shown below:

Column 5:
Line 35, delete "(drive plus)" and insert -- (drive pulse) --.
Line 59, delete "drive plus." and insert -- drive pulse. --.

Column 6:
Line 6, delete "plus." and insert -- pulse. --.

Column 7:
Line 34, delete "pluses)" and insert -- pulses) --.
Line 45, delete "pluses)" and insert -- pulses) --.
Line 50, delete "pluses," and insert -- pulses, --.
Line 55, delete "pluses." and insert -- pulses. --.

Column 14:
Line 55, claim 14, delete "t2" and insert -- f2 --.
Line 60, claim 14, delete "f1=2 × n × 12" and insert -- f1=2 × n × f2 --.
Line 61, claim 14, delete "12=2 × n × f1" and insert -- f2=2 × n × f1 --.

Signed and Sealed this
Twenty-eighth Day of June, 2011

David J. Kappos
*Director of the United States Patent and Trademark Office*